(12) United States Patent
Kandori (10) Patent No.: US 6,946,808 B2
(45) Date of Patent: Sep. 20, 2005

(54) MOTOR DRIVE CONTROL CIRCUIT AND MOTOR DRIVE APPARATUS

(75) Inventor: Daisuke Kandori, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 105 days.

(21) Appl. No.: 10/654,001

(22) Filed: Sep. 4, 2003

(65) Prior Publication Data

US 2004/0056628 A1 Mar. 25, 2004

(30) Foreign Application Priority Data

Sep. 4, 2002 (JP) .................................... 2002-259186

(51) Int. Cl.[7] .............................................. H02K 23/00
(52) U.S. Cl. ..................... 318/254; 318/138; 318/439
(58) Field of Search ............................. 318/254, 439, 318/138, 721, 560, 700, 720, 722, 725, 650

(56) References Cited

U.S. PATENT DOCUMENTS 5,432,414 A * 7/1995 Sakurai et al. .............. 318/254

6,316,894 B2 * 11/2001 Hashimura ................. 318/439

FOREIGN PATENT DOCUMENTS

| JP | 62-189993 | 8/1987 |
| JP | 04-046583 | 2/1992 |
| JP | 04-101696 | 4/1992 |
| JP | 5-268791 | 10/1993 |

* cited by examiner

Primary Examiner—Karen Masih
(74) Attorney, Agent, or Firm—Arent Fox PLLC (57) ABSTRACT

Conventional position-sensorless motor drive control circuits start a motor by a method that has the disadvantage that the motor is not always started in the forward direction or by a method that has the disadvantage that a current detection resistor produces a power loss. According to the invention, a motor drive control circuit that controls, with drive signals, a drive portion that feeds drive currents to the stator coils of a motor has a drive signal output circuit that outputs rotor position detection drive signals to the drive portion before the starting of the motor and a detection circuit that receives the common-terminal voltage of the stator coils when the drive signal output circuit is outputting the rotor position detection drive signals and that detects, according to the common-terminal voltage of the stator coils, the position of the rotor before the starting of the motor.

12 Claims, 6 Drawing Sheets

| REGISTER VALUE | ROTOR POSITION | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $R_1$ | 1 | 1 | 1 | 1 | 1 | 1 | 1 | 1 | 0 | 0 | 0 | 1 |
| $R_2$ | 1 | 0 | 0 | 0 | 0 | 0 | 0 | 0 | 0 | 0 | 1 | 1 |
| $R_3$ | 0 | 0 | 0 | 1 | 1 | 1 | 1 | 1 | 1 | 1 | 1 | 1 |
| $R_4$ | 0 | 0 | 1 | 1 | 1 | 0 | 0 | 0 | 0 | 0 | 0 | 0 |
| $R_5$ | 1 | 1 | 1 | 0 | 0 | 0 | 0 | 1 | 1 | 1 | 1 | 1 |
| $R_6$ | 0 | 0 | 0 | 0 | 0 | 0 | 1 | 1 | 1 | 0 | 0 | 0 |

Fig. 5

| STARTING LOGIC | ROTOR POSITION | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $Y_1$ | H | H | M | M | L | L | L | L | M | M | H | H |
| $Y_2$ | M | M | H | H | H | H | M | M | L | L | L | L |
| $Y_3$ | L | L | L | L | M | M | H | H | H | H | M | M |

MOTOR DRIVE CONTROL CIRCUIT AND MOTOR DRIVE APPARATUS

BACKGROUND OF THE INVENTION

1. Field of the Invention

The present invention relates to a motor drive control circuit of a position-sensorless type, and to a motor drive apparatus provided with such a motor drive control circuit.

2. Description of the Prior Art

In conventional position-sensorless motor drive control circuits, one way to start a motor is by forcibly vibrating the motor with a predetermined sequence that is unrelated to the position of the rotor (hereinafter refereed to as "Method I"). Another way is by providing a current detection resistor and feeding the stator coils of the motor with current pulses before starting the motor so as to detect the energization status of the stator coils with the current detection resistor and then determine, according to the result of the detection, the starting logic state that permits the motor to be started in the forward direction (hereinafter refereed to as "Method II").

Figure 11:
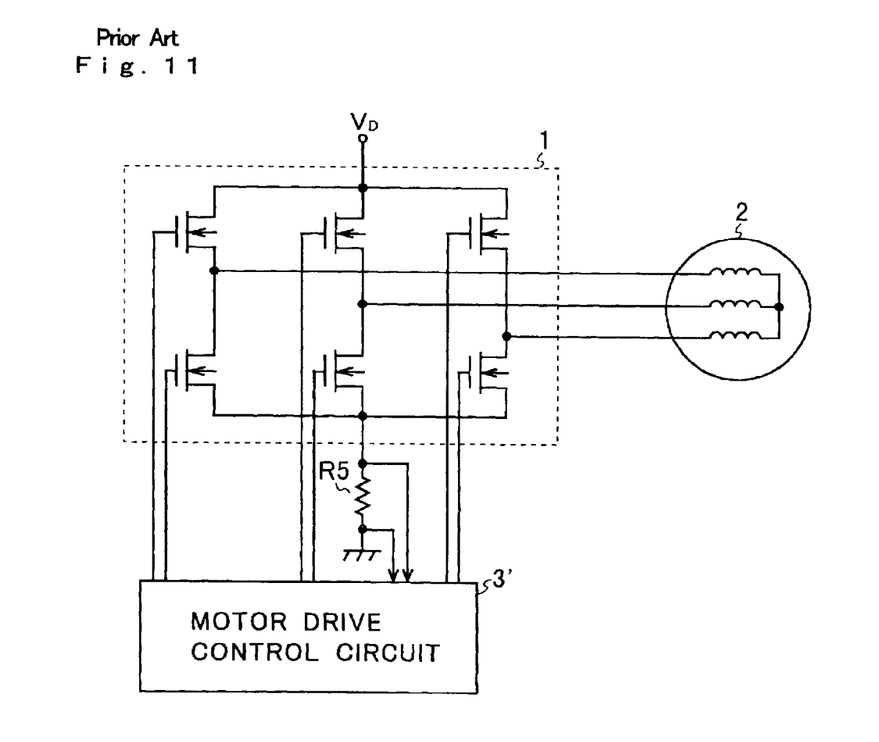
FIG. 11 is a diagram showing an example of the configuration of a conventional position-sensorless motor drive apparatus.

FIG. 11 shows an example of the configuration of a position-sensorless motor drive apparatus that starts a motor by Method II described above. A drive portion 1 converts a drive voltage $V_D$ into three-phase voltages, and outputs them to a three-phase brushless motor 2 (hereinafter referred to as the motor 2). A current detection resistor R5 detects the energization status of the drive portion 1. A motor drive control circuit 3' detects the current that flows through the current detection resistor R5 before the motor 2 is started, then determines, according to the detected current, the starting logic state that permits the motor to be started in the forward direction, and then controls the drive portion 1 with drive signals generated on the basis of the starting logic state.

However, Method I described above has the disadvantage that, since the motor is fed with three-phase voltages generated on the basis of a starting logic state that is unrelated to the rotor position, the motor is not always started in the forward direction. On the other hand, Method II has the disadvantage that the current detection resistor produces a power loss. Thus, there have conventionally been available no motor derive apparatuses that are suitable for use in portable appliances, such as portable MD (minidisk) players, in which rotation of a disk is frequently started and stopped.

Incidentally, in the motor drive apparatus disclosed in Japanese Patent Application Laid-Open No. H5-268791, the rotor position is detected by monitoring zero-cross voltages in coils that are in a floating state. With this detection method, however, it is not possible to detect the rotor position unless the motor is rotating. Thus, with this detection method, it is possible to detect the rotor position when synchronism is recovered after being momentarily lost, but it is impossible to detect the rotor position before the starting of the motor.

SUMMARY OF THE INVENTION

An object of the present invention is to provide a motor drive control circuit that operates with stable starting characteristics and with low power consumption, a motor drive apparatus employing such a motor drive control circuit, and an electric appliance employing such a motor drive apparatus.

To achieve the above object, according to one aspect of the present invention, a motor drive control circuit that controls, with drive signals, a drive portion that feeds drive currents to the stator coils of a motor is provided with: a drive signal output circuit that outputs rotor position detection drive signals to the drive portion before the starting of the motor; and a detection circuit that receives the common-terminal voltage of the stator coils when the drive signal output circuit is outputting the rotor position detection drive signals and that detects, according to the common-terminal voltage of the stator coils, the position of the rotor before the starting of the motor.

According to another aspect of the present invention, a motor drive apparatus is provided with: a motor; a drive portion that feeds drive currents to the stator coils of the motor; and a motor drive control circuit configured as described above which controls the drive portion with drive signals.

According to still another aspect of the present invention, an electric appliance is provided with: a motor drive apparatus configured as described above; and a rotating member that is driven by the motor drive apparatus

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
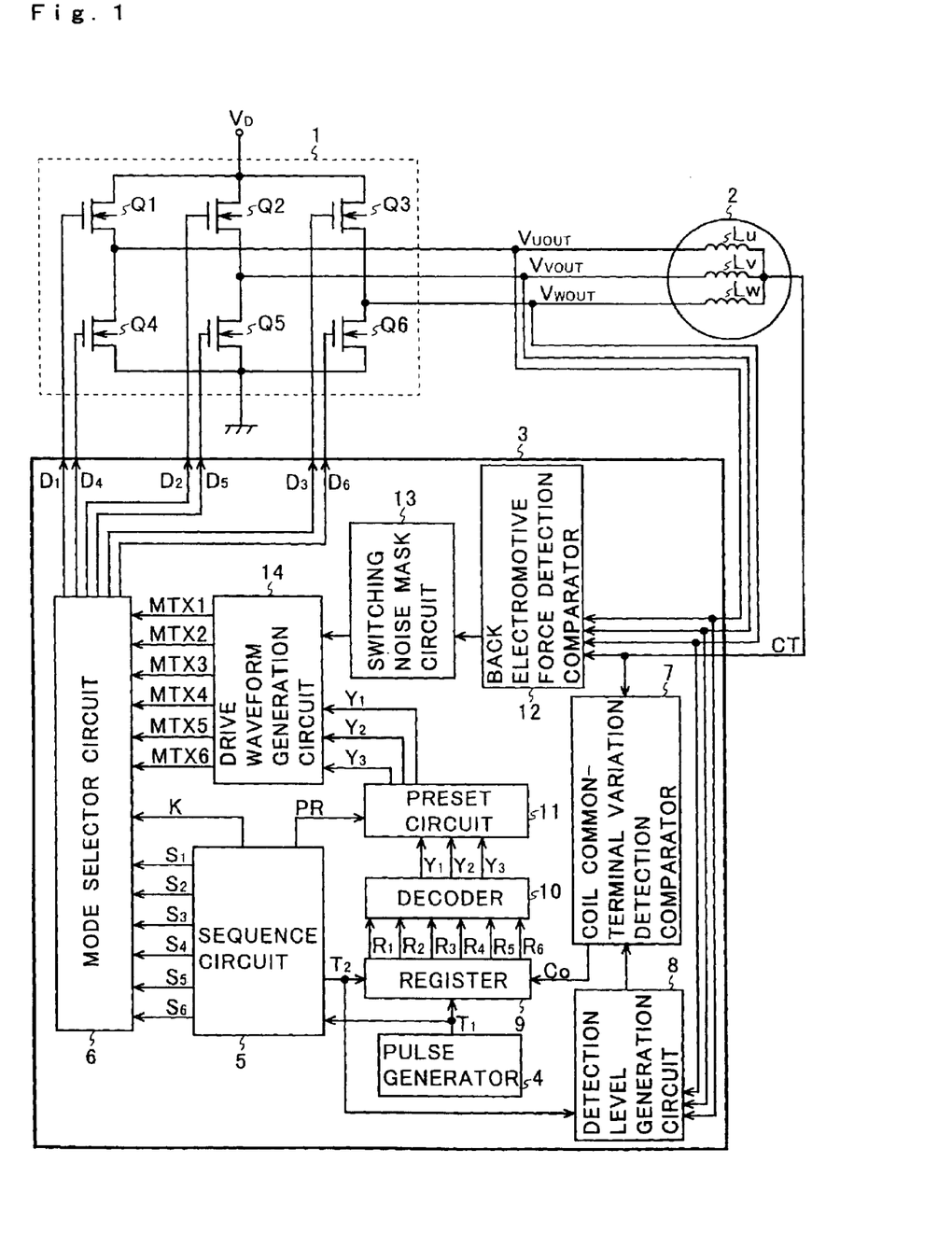
FIG. 1 is a diagram showing the configuration of a motor drive apparatus embodying the invention.

FIG. 1 shows an example of the configuration of a motor drive apparatus embodying the invention. Here, such circuit blocks and components as are also found in FIG. 11 are identified with the same reference numerals and symbols. The motor drive apparatus shown in FIG. 1 is designed for a three-phase motor, and is composed of a drive portion 1, a motor 2, and a motor drive control circuit 3.

The drive portion 1 is a three-phase drive circuit, and is composed of power transistors Q1 to Q6, which are n-channel MOSFETs [metal-oxide semiconductor field-effect transistors]. The drains of the power transistors Q1 to Q3 are connected together, and are connected to a terminal to which a drive voltage $V_D$ is applied. The source of the power transistor Q1 is connected to the drain of the power transistor Q4, the source of the power transistor Q2 is connected to the drain of the power transistor Q5, and the source of the power transistor Q3 is connected to the drain of the power transistor Q6. The sources of the power transistors Q4 to Q6 are connected together, and are connected to ground.

The motor 2 has three stator coils Lu, Lv, and Lw. One end of the stator coil Lu is connected to the node between the power transistors Q1 and Q4, one end of the stator coil Lv is connected to the node between the power transistors Q2 and Q5, and one end of the stator coil Lw is connected to the node between the power transistors Q3 and Q6. The other ends of the stator coils Lu, Lv, and Lw of the motor 2 are connected together.

The motor drive control circuit 3 is connected to the individual nodes between the drive portion 1 and the motor 2, is also connected to the other ends (connected together) of the stator coils Lu, Lv, and Lw of the motor 2, and is also connected, through terminals by way of which to output drive signals $D_1$ to $D_6$, to the individual gates of the power transistors Q1 to Q6 provided in the drive portion 1.

The drive portion 1 is controlled by the drive signals $D_1$ to $D_6$ output from the motor drive control circuit 3. Then, the drive portion 1 feeds drive currents to the motor 2 to rotate it.

Next, the motor drive control circuit 3 will be described. The motor drive control circuit 3 is composed of a pulse generator 4, a sequence circuit 5, a mode selector circuit 6, a coil common-terminal variation detection comparator 7, a detection level generation circuit 8, a register 9, a decoder 10, a preset circuit 11, a back electromotive force detection comparator 12, a switching noise mask circuit 13, and a drive waveform generation circuit 14. This configuration eliminates the need to provide a current detection resistor for detecting the conduction status of the stator coils of the motor, and thus helps reduce the power loss in the current detection resistor.

The pulse generator 4, on receiving an external signal (motor start request signal) from an unillustrated control circuit or the like, outputs a short-period pulse signal $T_1$ (for example, a pulse signal with 50 kHz pulses) for a predetermined period to the sequence circuit 5 and to the register 9.

The sequence circuit 5 operates only when it is receiving the short-period pulse signal $T_1$. During this period, on the basis of the short-period pulse signal $T_1$, the sequence circuit 5 generates signals $S_1$ to $S_6$ and a period switch timing signal $T_2$ that indicates time points $t_1$, $t_2$, ..., and $t_6$ (all these signals and time points are shown in a time chart in FIG. 2), and outputs the signals $S_1$ to $S_6$ and a start signal K to the mode selector circuit 6.

Figure 2:
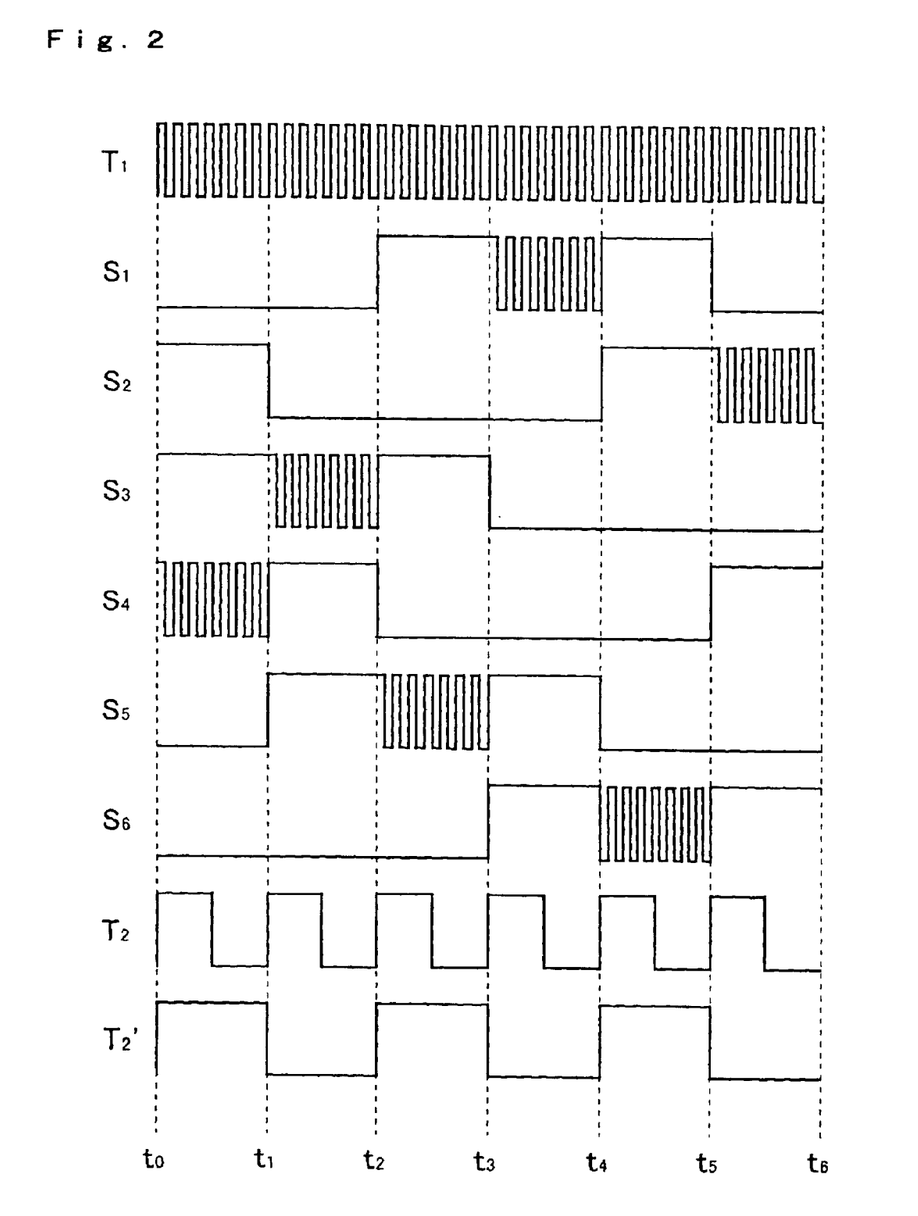
FIG. 2 is a time chart of the signals that act as the rotor position detection drive signals before the starting of the motor.

The signals $S_1$ to $S_6$ are output only for so short a period as not to cause the motor to start to rotate. In this embodiment, the periods from $t_0$ to $t_1$, from $t_1$ to $t_2$, ..., and from $t_5$ to $t_6$ are each 600 μs. The signals $S_1$ to $S_6$ each have a high-level period, during which it remains high, a low-level period, during which it remains low, and a pulse period, during which it has the same waveform as the short-period pulse signal $T_1$. For example, the signal $S_1$ has a low-level period during the period from $t_0$ to $t_2$, a high-level period during the period from $t_2$ to $t_3$, a pulse period during the period from $t_3$ to $t_4$, a high-level period during the period from $t_4$ to $t_5$, and a low-level period during the period from $t_5$ to $t_6$.

Figure 3:
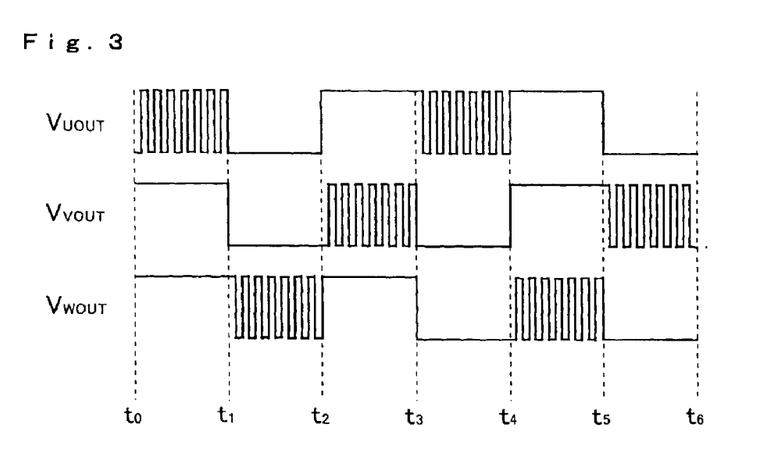
FIG. 3 is a time chart of the motor voltages when the rotor position is detected before the starting of the motor.

The mode selector circuit 6, when it is receiving the start signal K, operates in a rotor position detection mode; specifically, it selects the signals $S_1$ to $S_6$ and outputs them as the drive signals $D_1$ to $D_6$ to the drive portion 1 in order to turn on and off the power transistors Q1 to Q6 provided in the drive portion 1. Specifically, during the period from $t_0$ to $t_1$, the power transistors Q1, Q5, and Q6 are off, the power transistors Q2 and Q3 are on, and the power transistor Q4 performs switching operation; during the period from $t_1$ to $t_2$, the power transistors Q1, Q2, and Q6 are off, the power transistors Q4 and Q5 are on, and the power transistor Q3 performs switching operation; during the period from $t_2$ to $t_3$, the power transistors Q2, Q4, and Q6 are off, the power transistors Q1 and Q3 are on, and the power transistor Q5 performs switching operation. Likewise, during the period from $t_3$ to $t_4$, the power transistors Q2, Q3, and Q4 are off, the power transistors Q5 and Q6 are on, and the power transistor Q1 performs switching operation; during the period from $t_4$ to $t_5$, the power transistors Q3, Q4, and Q5 are off, the power transistors Q1 and Q2 are on, and the power transistor Q6 performs switching operation; during the period from $t_5$ to $t_6$, the power transistors Q1, Q3, and Q5 are off, the power transistors Q4 and Q6 are on, and the power transistor Q2 performs switching operation. Accordingly, during the period from $t_0$ to $t_6$, the motor voltages $V_{uout}$, $V_{vout}$, and $V_{wout}$, i.e., the voltages at the individual nodes between the drive portion 1 and the motor 2, have waveforms as shown in a time chart in FIG. 3. In this way, short-period current pulses having the same period as the short-period pulse signal $T_1$ are fed to one of the stator coils Lu, Lv, and Lw at a time.

The rotor of the motor 2 is fitted with a magnet, and the magnetic field produced by this magnet causes the impedances of the stator coils to vary. Thus, the impedances of the stator coils vary with the position of the rotor. Accordingly, when short-period current pulses are fed to the stator coils, their common-terminal voltage CT varies with the rotor position. Incidentally, the aim of giving a short period to the current pulses fed to the stator coils is to increase the impedances of the stator coils and thereby increase the variation width of their common-terminal voltage CT.

The coil common-terminal variation detection comparator 7 compares the common-terminal voltage CT of the stator coils with a detection level output from the detection level generation circuit 8, and outputs their differential signal Co to the register 9.

The detection level generation circuit 8 receives the motor voltages $V_{uout}$, $V_{vout}$, and $V_{wout}$ and the period switch timing signal $T_2$ output from the sequence circuit 5, and generates different detection levels corresponding to the different periods (i.e., the periods from $t_0$ to $t_1$, from $t_1$ to $t_2$, ..., and from $t_5$ to $t_6$). Incidentally, how many times to feed the short-period current pulses, the frequency of the short-period current pulses, and the detection levels are determined to suit the motor 2.

The register 9 receives the short-period pulse signal $T_1$, and latches the differential signal Co on every trailing edge of the short-period pulse signal $T_1$. Moreover, the register 9 receives the period switch timing signal $T_2$, and successively stores, as resistor values $R_1$ to $R_6$, the differential signal Co latched at the time points $t_1$ to $t_6$, respectively. The register 9 then outputs the register values $R_1$ to $R_6$ to the decoder 10. Incidentally, if the differential signal Co is high when stored, the value "1" is stored as the register value corresponding to that time point, and, if the differential signal Co is low when stored, the value "0" is stored as the register value corresponding to that time point.

Figure 4:
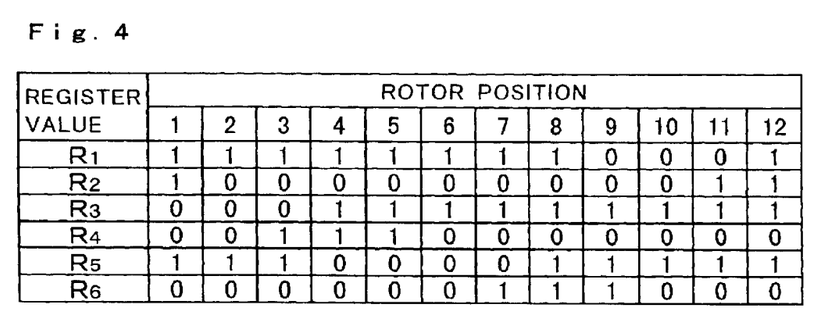
FIG. 4 is a diagram showing the relationship between the register values stored in the register provided in the motor drive apparatus shown in FIG. 1 and the rotor position before the starting of the motor.
Figure 5:
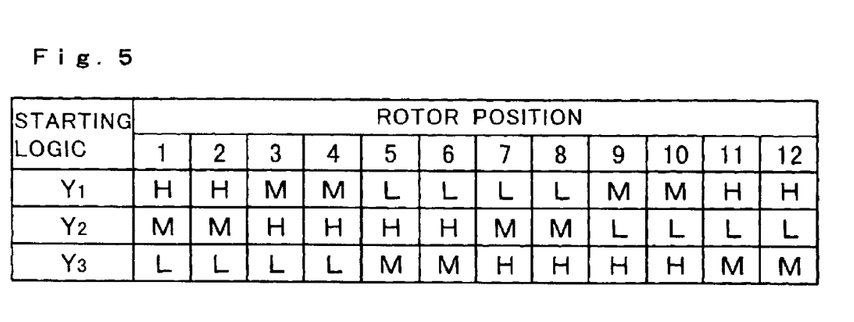
FIG. 5 is a diagram showing the relationship between the starting logic state output from the decoder provided in the motor drive apparatus shown in FIG. 1 and the rotor position before the starting of the motor.

In this embodiment, the relationship between the resistor values $R_1$ to $R_6$ and the rotor position before the starting of the motor is as shown in FIG. 4. In FIG. 4, rotor positions "1" to "12" correspond to the range of electrical angles from 0° to 30°, from 30° to 60°, ..., and from 330° to 360°, respectively. In the decoder 10 is previously stored the relationship shown in FIG. 4 between the resistor values $R_1$ to $R_6$ and the rotor position before the starting of the motor, so that the decoder 10 detects, on the basis of the register values $R_1$ to $R_6$ output from the register 9, the rotor position before the starting of the motor. Also stored previously in the decoder 10 are different starting logic states for different rotor positions as shown in FIG. 5, so that the decoder 10 feeds the preset circuit 11 with a starting logic state, in the form of a combination of individual logic states $Y_1$ to $Y_3$, that corresponds to the rotor position detected before the starting of the motor. In FIG. 5, rotor positions "1" to "12" are the same as those shown in FIG. 4; moreover, "H" demands that the corresponding motor voltage be in a high-level (=the voltage $V_D$) period, "M" demands that the corresponding motor voltage be in a high-impedance period, and "L" demands that the corresponding motor voltage be in a low-level (=the ground potential) period; furthermore, the individual logic states $Y_1$, $Y_2$, and $Y_3$ indicate the logic states of the individual motor voltages $V_{uout}$, $V_{vout}$, and $V_{wout}$, respectively.

The sequence circuit 5, on completion of its operation sequence, feeds a preset signal PR to the preset circuit 11. On receiving the preset signal PR, the preset circuit 11 feeds the starting logic state $Y_1$ to $Y_3$ to the drive waveform generation circuit 14.

According to the starting logic state $Y_1$ to $Y_3$, the drive waveform generation circuit 14 generates signals MTX1 to MTX6, and feeds them to the mode selector circuit 6. The mode selector circuit 6, when it ceases to receive the start signal K from the sequence circuit 5, starts to operate in a sensorless drive mode; specifically, it selects the signals MTX1 to MTX6 and feeds them as the drive signals $D_1$ to $D_6$ to the drive portion 1.

The operation described above makes it possible to surely start the motor in the forward direction. After the motor is started, the back electromotive force detection comparator 12 detects, on the basis of the motor voltages $V_{uout}$, $V_{vout}$, and $V_{wout}$ and the common-terminal voltage CT of the stator coils, the back electromotive forces appearing in the stator coils in a floating state, and outputs a detection signal of those back electromotive forces to the switching noise mask circuit 13. On receiving the detection signal of the back electromotive forces, the switching noise mask circuit 13 removes therefrom switching noise generated by the switching operation of the power transistors Q1 to Q6, and then outputs it to the drive waveform generation circuit 14. The drive waveform generation circuit 14 has already detected, on the basis of the detection signal of the back electromotive forces, the rotor position during the rotation of the motor, and generates the signals MTX1 to MTX6 according to the rotor position. Here, the mode selector circuit 6 is operating in the sensorless drive mode, and therefore it outputs the signals MTX1 to MTX6 as the drive signals $D_1$ to $D_6$ to the drive portion 1.

Figure 6:
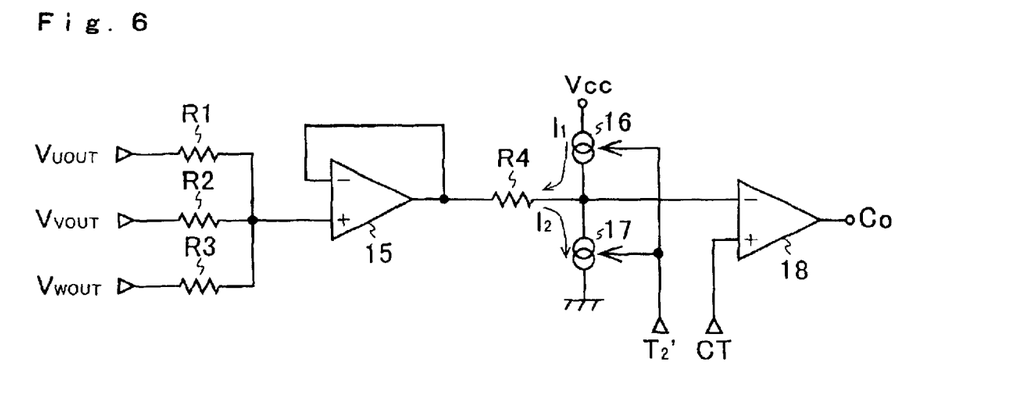
FIG. 6 is a diagram showing an example of the configuration of the coil common-terminal variation detection comparator and the detection level generation circuit provided in the motor drive apparatus shown in FIG. 1.

FIG. 6 shows an example of the configuration of the coil common-terminal variation detection comparator 7 and the detection level generation circuit 8. The motor voltage $V_{uout}$ is fed to one end of a resistor R1, the motor voltage $V_{vout}$ is fed to one end of a resistor R2, and the motor voltage $V_{wout}$ is fed to one end of a resistor R3. The other ends of the resistors R1 to R3 are connected together, and are connected to the non-inverting input terminal of a differential amplifier 15. The output terminal and inverting input terminal of the differential amplifier 15 are connected to one end of a resistor R4. A terminal to which a constant voltage $V_{CC}$ is applied is connected through a constant current source 16 to the other end of the resistor R4 and to the inverting input terminal of a comparator 18, and then through a constant current source 17 to ground. The comparator 18 receives, at its non-inverting input terminal, the common-terminal voltage CT of the stator coils. The comparator 18 outputs a differential signal Co.

The circuit configured as described above operates in the following manner. The resistors R1 to R3 produces a virtual common-terminal voltage from the motor voltages $V_{uout}$, $V_{vout}$, and $V_{wout}$. The differential amplifier 15 buffers the virtual common-terminal voltage.

The resistor R4, the constant current source 16, and the constant current source 17 produce a detection level by offsetting the virtual common-terminal voltage. The constant current sources 16 and 17 are turned on and off by a signal $T_2'$ based on the period switch timing signal $T_2$. During the periods from $t_0$ to $t_1$, from $t_2$ to $t_3$, and from $t_4$ to $t_5$, the constant current source 16 is off, and the constant current source 17 is on. This causes a current $I_2$ to be extracted from the resistor R4, and thus the level of the common-terminal voltage is shifted downward. Incidentally, in this embodiment, the level is shifted by −40 mV. On the other hand, during the periods from $t_1$ to $t_2$, from $t_3$ to $t_4$, and from $t_5$ to $t_6$, the constant current source 16 is on, and the constant current source 17 is off. This causes a current $I_1$ to be supplied to the resistor R4, and thus the level of the common-terminal voltage is shifted upward. Incidentally, in this embodiment, the level is shifted by +40 mV.

The comparator 18 corresponds to the coil common-terminal variation detection comparator 7 shown in FIG. 1. The comparator 18, when the motor coil common-terminal voltage CT is higher than the detection level, turns the differential signal Co high, and, when the motor coil common-terminal voltage CT is not higher than the detection level, turns the differential signal Co low.

Figure 9A:
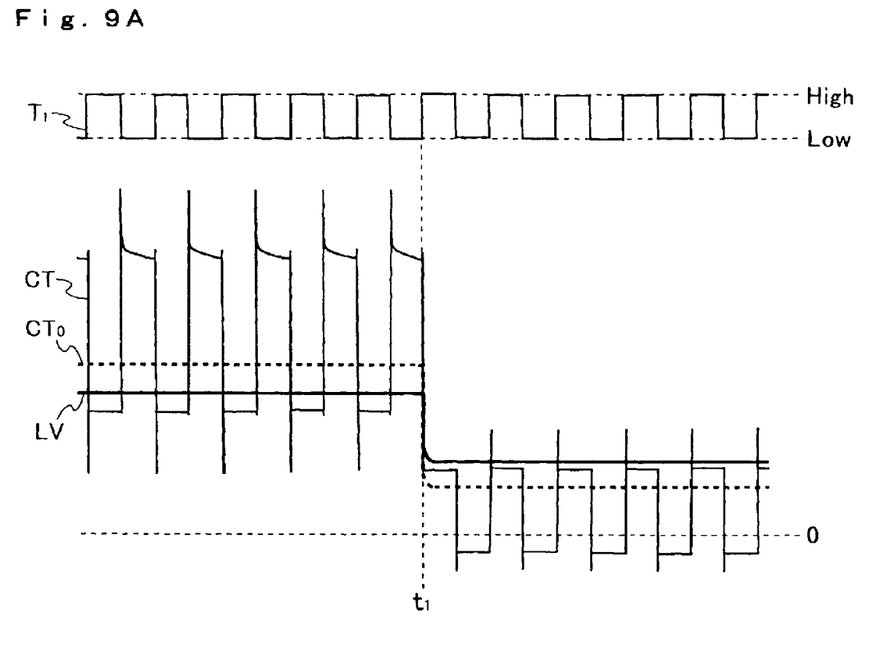
FIG. 9A is a time chart of the waveforms of the pulse signals output from the pulse generator provided in the motor drive apparatus shown in FIG. 1 and the waveforms of the voltages observed at relevant points in the circuit shown in FIG. 6, in a case where the rotor position before the starting of the motor is in the range of electrical angles from 240° to 270°.
Figure 9B:
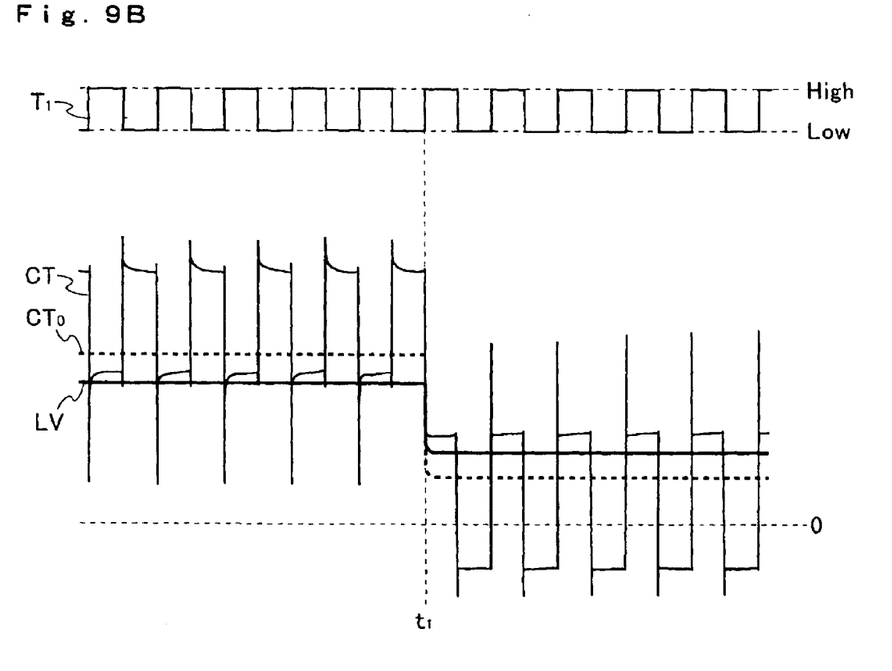
FIG. 9B is a time chart of the waveforms of the pulse signals output from the pulse generator provided in the motor drive apparatus shown in FIG. 1 and the waveforms of the voltages observed at relevant points in the circuit shown in FIG. 6, in a case where the rotor position before the starting of the motor is in the range of electrical angles from 0° to 30°.

FIGS. 9A and 9B are time charts showing the waveforms of the short-period pulse signal $T_1$ output from the pulse generator 4 and the voltages observed at relevant points in the circuit shown in FIG. 6 before and after the time point $t_1$. Here, $CT_0$ represents the voltage at the node between the resistors R1 to R3, i.e., the virtual common-terminal voltage, and LV represents the voltage fed to the inverting input terminal of the comparator 18, i.e., the virtual common-terminal voltage having its level shifted. FIG. 9A shows the voltage waveforms observed when the rotor position before the starting of the motor is "9" (in the range of electrical angles from 240° to 270°), and FIG. 9B shows the voltage waveforms observed when the rotor position before the starting of the motor is "1" (in the range of electrical angles from 0° to 30°).

Figure 8:
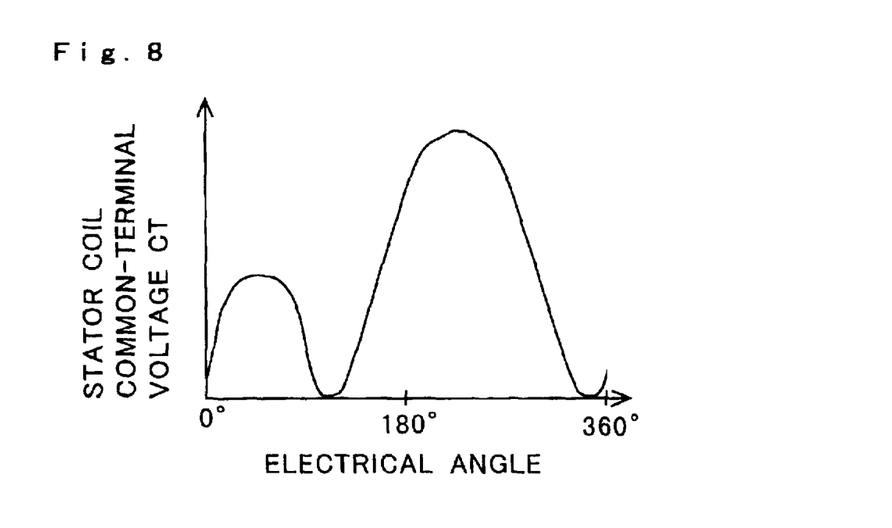
FIG. 8 is a diagram showing the relationship between the common-terminal voltage of the stator coils and the rotor position before the starting of the motor.

Now, why the level of the virtual common-terminal voltage is shifted will be described. FIG. 8 shows the relationship between the common-terminal voltage CT of the stator coils as detected on the trailing edges of the short-period pulse signal $T_1$ with the motor voltages $V_{uout}$, $V_{vout}$, and $V_{wout}$ applied to the motor 2 during the period from $t_5$ to $t_6$ shown in FIG. 3 and the electrical angle of the rotor position before the starting of the motor. The common-terminal voltage CT of the stator coils has a small peak around an electrical angle of 45° and a large peak around an electrical angle of 225°. If the detection level is lower than the small peak around an electrical angle of 45°, it is impossible to correctly detect the rotor position. For this reason, the level of the virtual common-terminal voltage is shifted so that the detection level never becomes lower than the small peak around an electrical angle of 45°.

Figure 7:
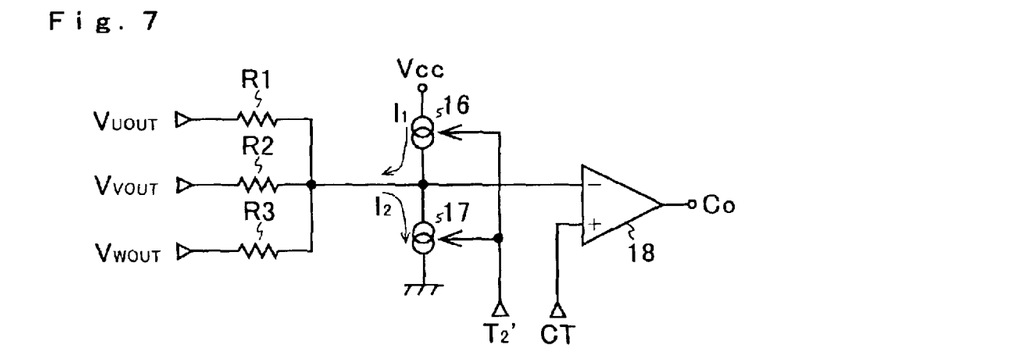
FIG. 7 is a diagram showing another example of the configuration of the coil common-terminal variation detection comparator and the detection level generation circuit provided in the motor drive apparatus shown in FIG. 1.

Instead of the configuration shown in FIG. 6, the configuration shown in FIG. 7 may be used. The circuit shown in FIG. 7 differs from that shown in FIG. 6 in that the differential amplifier 15 and the resistor R4 are omitted from the circuit shown in FIG. 6 and instead the node between the resistors R1 to R3 is directly connected to the node between the constant current sources 16 and 17 and the comparator 18.

The circuits shown in FIGS. 6 and 7 may be additionally provided with another two serial pairs of constant current sources, each pair having two constant current sources connected in series. In that case, each serial pair of constant current sources is so set as to output a different current, and a selector circuit for selecting one constant current source from the three pairs of constant current sources is provided. This makes it possible to shift the level by different amounts in the different periods from $t_0$ to $t_1$, from $t_1$ to $t_2$, . . . , and from $t_5$ to $t_6$. This increases the number of level shift patterns to six, while there are two in the circuits shown in FIGS. 6 and 7. Advisably, the number of level shift patterns is determined according to the type of the motor actually used.

Figure 10:
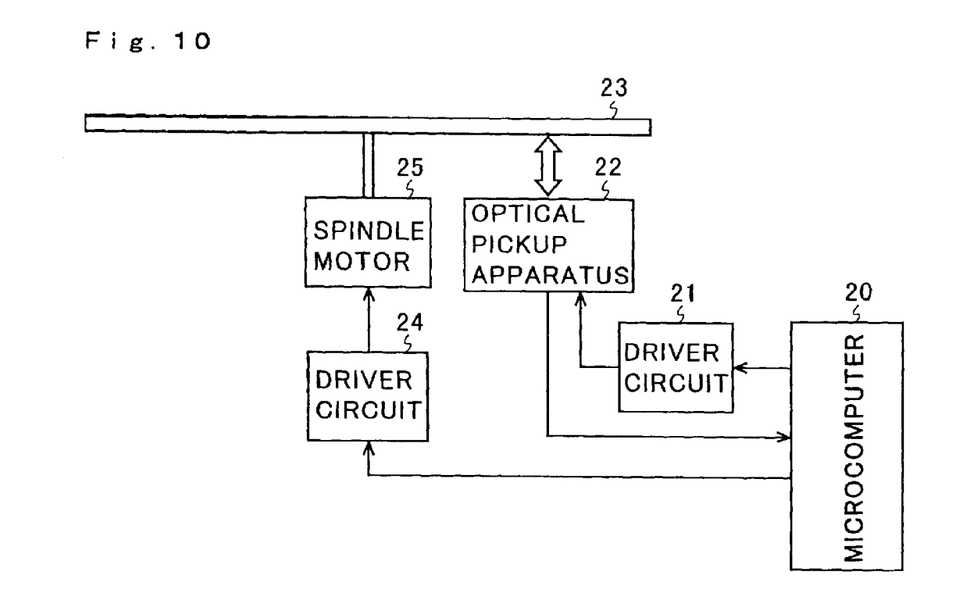
FIG. 10 is a diagram showing the configuration of an optical disk playback apparatus embodying the invention.

Next, as an example of an electric appliance embodying the invention, an optical disk playback apparatus will be described with reference to FIG. 10. An optical pickup apparatus 22 irradiates an optical disk 23, such as a minidisk, with laser light, then reads a signal from the laser light reflected from the optical disk 23, and then feeds the read signal to a microcomputer 20.

A driver circuit 21 drives the optical pickup apparatus 22 according to instructions from the microcomputer 20. The optical pickup apparatus 22 is moved, by a stepping motor (not illustrated) incorporated therein, stepwise in the radial direction of the optical disk 23 so as to be positioned at the track where to read a signal.

Moreover, a driver circuit 24 drives a spindle motor 25 according to instructions from the microcomputer 20. The optical disk 23 is rotated via a spindle by the spindle motor 25.

Here, used as the driver circuit 24 and the spindle motor 25 are the motor drive apparatus shown in FIG. 1. Specifically, as the spindle motor 25 is used the motor 2, and as the driver circuit 24 is used a circuit composed of the drive portion 1 and the motor drive control circuit 3. The motor drive apparatus shown in FIG. 1 never starts the motor in the reverse direction, and therefore never requires an unduly long time to start the spindle motor 25. Moreover, the motor drive apparatus shown in FIG. 1 operates with reduced power consumption, and is therefore suitable for use in a portable optical disk playback apparatus that operates from a battery.

Incidentally, detecting the rotor position before the starting of a motor and then starting the motor according to the detection result as practiced in the embodiments described above is called "sensing start." The embodiments described hereinbefore deal with cases where the drive portion 1 and the motor drive control circuit 3 are formed in separate ICs. However, it is also possible to form the drive portion 1 and the motor drive control circuit 3 in a single IC.

What is claimed is:

1. A motor drive control circuit that controls, with drive signals, a drive portion that feeds drive currents to stator coils of a motor, comprising:
   a drive signal output circuit; and
   a detection circuit,
   wherein the drive signal output circuit outputs rotor position detection drive signals to the drive portion before starting of the motor,
   wherein the detection circuit receives a common-terminal voltage of the stator coils when the drive signal output circuit is outputting the rotor position detection drive signals, and detects, according to the common-terminal voltage of the stator coils, a position of a rotor before starting of the motor, and
   wherein the rotor position detection drive signals are signals that control the drive portion so that, before starting of the motor, the drive portion feeds the stator coils with rotor position detection drive currents that cause the common-terminal voltage of the stator coils to vary with the position of the rotor but that do not cause the motor to rotate.

2. A motor drive control circuit that controls, with drive signals, a drive portion that feeds drive currents to stator coils of a motor, comprising:
   a drive signal output circuit; and
   a detection circuit,
   wherein the drive signal output circuit outputs rotor position detection drive signals to the drive portion before starting of the motor,
   wherein the detection circuit receives a common-terminal voltage of the stator coils when the drive signal output circuit is outputting the rotor position detection drive signals, and detects, according to the common-terminal voltage of the stator coils, a position of a rotor before starting of the motor,
   wherein the detection circuit includes a plurality of resistors, a detection level generation circuit, and a comparator, and detects, according to the output of the comparator, the position of the rotor before starting of the motor,
   wherein the plurality of resistors, at one ends thereof, respectively receive voltages at nodes between the motor and the drive portion and, at the other ends thereof, are connected together,
   wherein the detection level generation circuit generates detection levels by shifting a voltage at the other ends of the plurality of resistors to levels corresponding to the rotor position detection drive signals, and wherein the comparator compares the detection levels with the common-terminal voltage of the stator coils.

3. A motor drive control circuit as claimed in claim 2, wherein the detection level generation circuit includes a serial circuit having two constant-current sources connected in series, and the other ends of the plurality of resistors are connected, either directly or through a buffer and a resistor, to a node between the two constant-current sources.

4. A motor drive apparatus comprising:
a motor;
a drive portion that feeds drive currents to stator coils of the motor; and
a motor drive control circuit that controls the drive portion with drive signals,
wherein the motor drive control circuit includes a drive signal output circuit and a detection circuit,
wherein the drive signal output circuit outputs rotor position detection drive signals to the drive portion before starting of the motor,
wherein the detection circuit receives a common-terminal voltage of the stator coils when the drive signal output circuit is outputting the rotor position detection drive signals, and detects, according to the common-terminal voltage of the stator coils, a position of a rotor before starting of the motor, and
wherein the rotor position detection drive signals are signals that control the drive portion so that, before starting of the motor, the drive portion feeds the stator coils with rotor position detection drive currents that cause the common-terminal voltage of the stator coils to vary with the position of the rotor but that do not cause the motor to rotate.

5. A motor drive apparatus comprising:
a motor;
a drive portion that feeds drive currents to stator coils of the motor; and
a motor drive control circuit that controls the drive portion with drive signals,
wherein the motor drive control circuit includes a drive signal output circuit and a detection circuit,
wherein the drive signal output circuit outputs rotor position detection drive signals to the drive portion before starting of the motor,
wherein the detection circuit receives a common-terminal voltage of the stator coils when the drive signal output circuit is outputting the rotor position detection drive signals, and detects, according to the common-terminal voltage of the stator coils, a position of a rotor before starting of the motor,
wherein the detection circuit includes a plurality of resistors, a detection level generation circuit, and a comparator, and detects, according to the output of the comparator, the position of the rotor before starting of the motor,
wherein the plurality of resistors, at one ends thereof, respectively receive voltages at nodes between the motor and the drive portion and, at the other ends thereof, are connected together,
wherein the detection level generation circuit generates detection levels by shifting a voltage at the other ends of the plurality of resistors to levels corresponding to the rotor position detection drive signals, and
wherein the comparator compares the detection levels with the common-terminal voltage of the stator coils.

6. A motor drive apparatus as claimed in claim 5, wherein the detection level generation circuit includes a serial circuit having two constant-current sources connected in series, and the other ends of the plurality of resistors are connected, either directly or through a buffer and a resistor, to a node between the two constant-current sources.

7. An electric appliance comprising:
a motor drive apparatus including:
a motor
a drive portion that feeds drive currents to stator coils of the motor; and
a motor drive control circuit that controls the drive portion with drive signals; and
a rotating member that is driven by the motor drive apparatus,
wherein the motor drive control circuit includes a drive signal output circuit and a detection circuit,
wherein the drive signal output circuit outputs rotor position detection drive signals to the drive portion before starting of the motor,
wherein the detection circuit receives a common-terminal voltage of the stator coils when the drive signal output circuit is outputting the rotor position detection drive signals, and detects, according to the common-terminal voltage of the stator coils, a position of a rotor before starting of the motor, and
wherein the rotor position detection drive signals are signals that control the drive portion so that, before starting of the motor, the drive portion feeds the stator coils with rotor position detection drive currents that cause the common-terminal voltage of the stator coils to vary with the position of the rotor but that do not cause the motor to rotate.

8. An electric appliance comprising:
a motor drive apparatus including:
a motor;
a drive portion that feeds drive currents to stator coils of the motor; and
a motor drive control circuit that controls the drive portion with drive signals; and
a rotating member that is driven by the motor drive apparatus,
wherein the motor drive control circuit includes a drive signal output circuit and a detection circuit,
wherein the drive signal output circuit outputs rotor position detection drive signals to the drive portion before starting of the motor,
wherein the detection circuit receives a common-terminal voltage of the stator coils when the drive signal output circuit is outputting the rotor position detection drive signals, and detects, according to the common-terminal voltage of the stator coils, a position of a rotor before starting of the motor,
wherein the detection circuit includes a plurality of resistors, a detection level generation circuit, and a comparator, and detects, according to the output of the comparator, the position of the rotor before starting of the motor,
wherein the plurality of resistors, at one ends thereof, respectively receive voltages at nodes between the motor and the drive portion and, at the other ends thereof, are connected together,
wherein the detection level generation circuit generates detection levels by shifting a voltage at the other ends of the plurality of resistors to levels corresponding to the rotor position detection drive signals, and wherein the comparator compares the detection levels with the common-terminal voltage of the stator coils.

9. An electric appliance as claimed in claim 8, wherein the detection level generation circuit includes a serial circuit having two constant-current sources connected in series, and the other ends of the plurality of resistors are connected, either directly or through a buffer and a resistor, to a node between the two constant-current sources.

10. An electric appliance as claimed in claim 7, wherein the electric appliance is an optical disk playback apparatus, and the motor is a spindle motor.

11. An electric appliance as claimed in claim 8, wherein the electric appliance is an optical disk playback apparatus, and the motor is a spindle motor.

12. An electric appliance as claimed in claim 9, wherein the electric appliance is an optical disk playback apparatus, and the motor is a spindle motor.

* * * * *